United States Patent
Patel et al.

(10) Patent No.: US 11,934,672 B2
(45) Date of Patent: Mar. 19, 2024

(54) CACHED WORKLOAD MANAGEMENT FOR A MULTI-TENANT HOST

(71) Applicant: International Business Machines Corporation, Armonk, NY (US)

(72) Inventors: Kushal S. Patel, Pune (IN); Ankur Srivastava, Pune (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 17/412,361

(22) Filed: Aug. 26, 2021

(65) Prior Publication Data
US 2023/0060575 A1    Mar. 2, 2023

(51) Int. Cl.
*G06F 12/00* (2006.01)
*G06F 3/06* (2006.01)

(52) U.S. Cl.
CPC .......... *G06F 3/0635* (2013.01); *G06F 3/0611* (2013.01); *G06F 3/0644* (2013.01); *G06F 3/0659* (2013.01); *G06F 3/067* (2013.01)

(58) Field of Classification Search
CPC .... G06F 3/0635; G06F 3/0611; G06F 3/0644; G06F 3/0659; G06F 3/067
See application file for complete search history.

(56) References Cited

U.S. PATENT DOCUMENTS

| 2012/0159474 | A1* | 6/2012 | Chakhaiyar | G06F 3/0611 718/1 |
| 2017/0300263 | A1* | 10/2017 | Helmick | G06F 3/0679 |
| 2018/0285294 | A1* | 10/2018 | Chagam Reddy | G06F 13/30 |
| 2019/0324903 | A1 | 10/2019 | Yoon | |
| 2019/0391933 | A1 | 12/2019 | Gupta | |
| 2020/0012602 | A1 | 1/2020 | Zhao | |
| 2020/0027192 | A1 | 1/2020 | Veernapu | |
| 2020/0065269 | A1* | 2/2020 | Balasubramani | G06F 13/1668 |
| 2020/0225874 | A1* | 7/2020 | Nimmagadda | G06F 3/0659 |
| 2020/0225988 | A1* | 7/2020 | Kuttan | G06F 9/45558 |
| 2020/0241927 | A1* | 7/2020 | Yang | G06F 9/466 |
| 2021/0089460 | A1* | 3/2021 | Anchi | G06F 12/0873 |
| 2022/0147247 | A1* | 5/2022 | Ammari | G06F 3/0679 |

(Continued)

OTHER PUBLICATIONS

Mell et al., "The NIST Definition of Cloud Computing", NIST, National Institute of Standards and Technology, Special Publication 800-145, Sep. 2011, 7 pages.

*Primary Examiner* — David Yi
*Assistant Examiner* — Tahilba O Puche
(74) *Attorney, Agent, or Firm* — Edward P. Li

(57) ABSTRACT

A computer-implemented method and a computer system for improving cached workload management. A host, which is in a system comprising the host and a storage system, obtains information about classes of applications accessing the storage system. The host determines input/output queues dedicated to respective ones of the classes. The storage system creates, in the storage system, cache partitions dedicated to the respective ones of the classes, based on information about classes. The host creates the input/output queues and sets bit flags for respective ones of the input/output queues. The host pumps inputs/outputs coming from the respective ones of the classes to the respective ones of the input/output queues. The storage system directs the input/output queues to respective ones of the cache partitions.

20 Claims, 6 Drawing Sheets

(56) References Cited

U.S. PATENT DOCUMENTS

| | | | |
|---|---|---|---|
| 2022/0156001 A1* | 5/2022 | Anandan | G06F 3/0673 |
| 2022/0191306 A1* | 6/2022 | Radi | H04L 69/163 |
| 2022/0269555 A1* | 8/2022 | Ganesan | G06F 11/3476 |
| 2022/0311716 A1* | 9/2022 | Dutta | H04L 47/40 |
| 2022/0342703 A1* | 10/2022 | Hong | G06F 9/5011 |
| 2022/0391333 A1* | 12/2022 | Veluswamy | G06F 9/5016 |
| 2022/0404993 A1* | 12/2022 | Mallick | G06F 3/0685 |

* cited by examiner

CACHED WORKLOAD MANAGEMENT FOR A MULTI-TENANT HOST

BACKGROUND

The present invention relates generally to improving cached workload management for a multi-tenant host, and more particularly to improving cached workload management for a multi-tenant host using non-volatile memory express (NVMe) over ethernet remote direct memory access (RDMA) in a storage system.

NVMe is a new storage protocol that is designed for faster data transfer between servers, storage devices, and flash controllers that typically use peripheral component interconnect express (PCIe) bus. The specification of NVMe provides a register interface and a command set that enabled high performance input/output (I/O). NVMe is an alternative to the traditional small computer system interface (SCSI) standards and other standards such as serial attached SCSI (SAS) and serial advanced technology attachment (SATA) for data transmission across hosts and storage systems. One of major advantages of NVMe-based PCIe flash over SAS-based or SATA-based solid-state drives (SSDs) is reduced latency of access in the host software stack; the advantage leads to higher input/output operations per second (IOPS) and lower central processing unit (CPU) utilization.

NVMe supports parallel I/O processing with multicore servers, so that NVMe results in faster I/O dispensation and thus leads to reduction in I/O latency. Since multiple cores process I/O requests simultaneously, system performance increases due to optimal utilization of CPU resources. Additionally, NVMe is designed in a way that it is expected to use lesser number of CPU instructions per I/O. NVMe also supports 64,000 Commands in a single message queue and a maximum of 65,535 I/O queues.

SUMMARY

In one aspect, a computer-implemented method for improving cached workload management is provided. The method includes obtaining, by a host in a system comprising the host and a storage system, information about classes of applications accessing the storage system. The method further includes determining, by the host, input/output queues dedicated to respective ones of the classes. The method further includes sending to the storage system, by the host, the information about the classes, based on which cache partitions dedicated to the respective ones of the classes are created in the storage system. The method further includes creating, by the host, the input/output queues and setting bit flags for respective ones of the input/output queues. The method further includes pumping, by the host, inputs/outputs coming from the respective ones of the classes to the respective ones of the input/output queues. In the computer-implemented method, the input/output queues are directed to respective ones of the cache partitions.

In another aspect, a computer-implemented method for improving cached workload management is provided. The method includes receiving from a host, by a storage system in a system comprising the host and the storage system, information about classes of applications accessing the storage system. The method further includes creating, by the storage system, in the storage system, cache partitions dedicated to respective ones of the classes, based on the information about the classes. The method further includes receiving from the host, by the storage system, input/output queues dedicated to the respective ones of the classes. The method further includes directing the input/output queues to respective ones of the cache partitions In yet another aspect, a computer system for improving cached workload management is provided. The computer system comprises one or more processors, one or more computer readable tangible storage devices, and program instructions stored on at least one of the one or more computer readable tangible storage devices for execution by at least one of the one or more processors. The program instructions are executable to: obtain, by a host in a system comprising the host and a storage system, information about classes of applications accessing the storage system; determine, by the host, input/output queues dedicated to respective ones of the classes; send to the storage system, by the host, the information about the classes; create, by the storage system, in the storage system, cache partitions dedicated to the respective ones of the classes, based on the information about the classes; create, by the host, the input/output queues and set bit flags for respective ones of the input/output queues; pump, by the host, inputs/outputs coming from the respective ones of the classes to the respective ones of the input/output queues; and direct the input/output queues to respective ones of the cache partitions.

DETAILED DESCRIPTION

NVMe over Fabrics (NVMe-oF or NVMeF) is an extension to local PCIe NVMe, and NVMe-oF allows benefits of NVMe like high-performance and low-latency across network fabrics. Servers and storage devices can be connected over Ethernet or Fibre Channel, both of which support NVMe commands over fabrics and therefore extends the advantages of NVMe protocol to interconnected system components. The stated design goal for NVMe-oF is to add no more than 10 microseconds of latency for communication between an NVMe host computer and a network-connected NVMe storage device, on top of the latency associated with accessing a PCIe NVMe storage.

NVMe-oF supports multiple I/O queues for regular I/O operation from host systems to storage systems. A maximum of about 65000 queues are supported by NVMe with about 64000 entries in each queue. It is host driver's responsibility to create queues once the connection is established. Once the host is connected to the storage or target system, a special purpose queue is created upon association, i.e., admin queue. As the name suggests, the admin queue is used to transfer control commends from the initiator or host to the target or storage system. Once the admin queue is created, it is used by a host to create I/O queues based on system requirements. The host may establish multiple I/O queues to a single controller with the same NVMe qualified name (NQN) and have multiple namespace (or volumes) mapped to the NQN. Once I/O queues are established, I/O commands are submitted to the I/O submission queue (SQ) and I/O responses are collected from the completion queue (CQ). These I/O queues can be added or removed using control instruction sent via the admin queue for the sessions.

When a command is received on the target device for the I/O queue creation, the target device performs initial system checks for max supported queues and other relevant fields and creates an I/O queue and assigns this I/O queue to a CPU core on the storage controller. Once done, a response to the queue creation request is returned via the admin completion queue. Each I/O queue is assigned to different CPU core on the storage controller. This allows parallelism and boosts throughput of the system. The core assignment logic is implemented at the target storage controller, and I/O queues to core mapping is performed based on a predefined policy at the storage controller.

Figure 1:
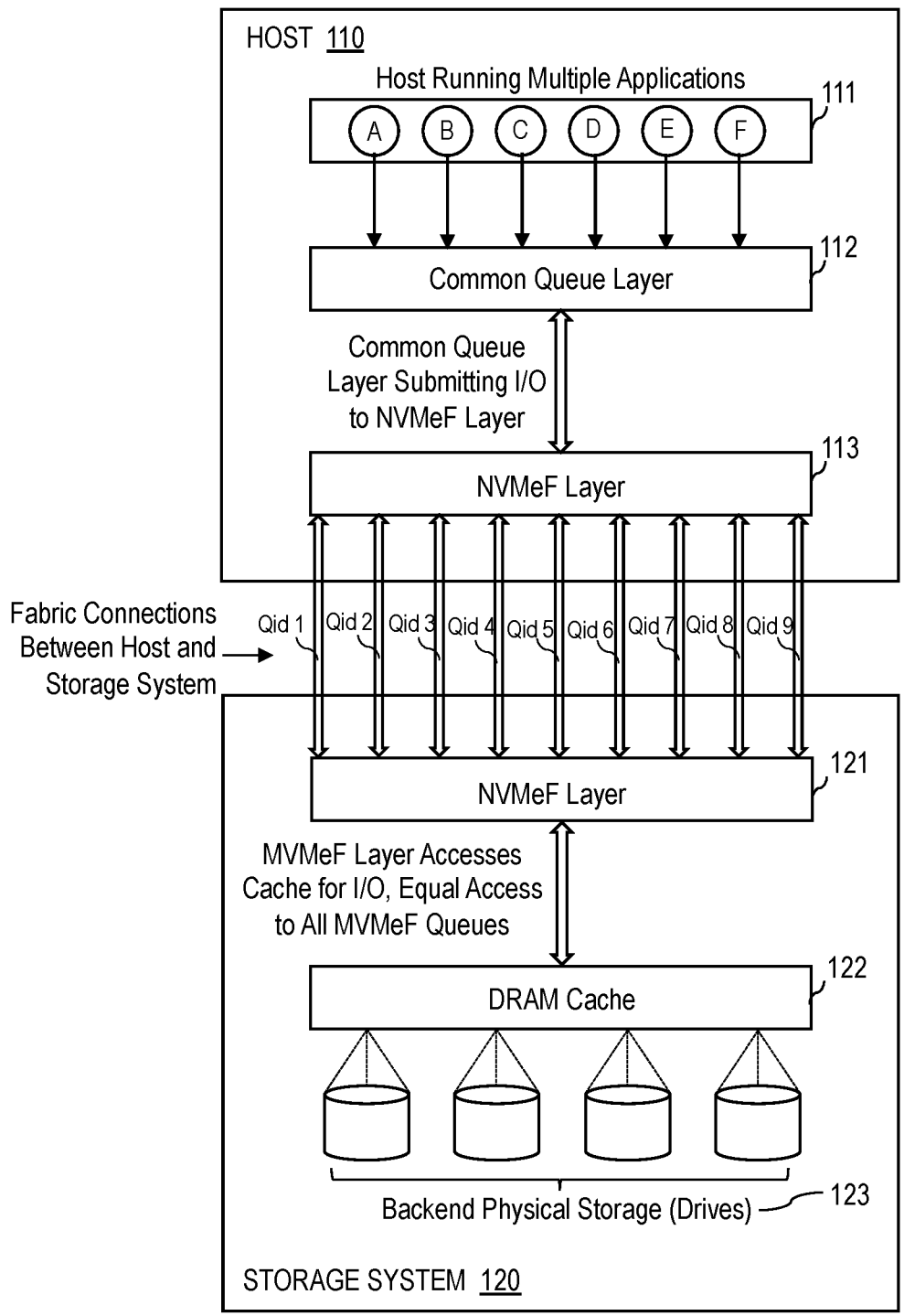
FIG. 1 is a systematic diagram illustrating a multi-tenant cloud environment including a host running multiple applications, in accordance with current technology.

FIG. 1 is a systematic diagram illustrating a multi-tenant cloud environment including a host running multiple applications, in accordance with current technology. As shown in FIG. 1, host 110 includes host running multiple applications 111 (or virtual machines/containers), including A, B, C, D, E, and F. All the applications perform I/Os to storage system 120 which have dynamic random-access memory (DRAM) cache 122 and backend physical storage (drives) 123. The applications submit I/Os to a common set of I/O queues to common queue layer 112 that further submits to NVMeF layer 113. Consider there are total 6 NVMe I/O queues acting as a fabric connection between NVMeF layer 113 on host 110 to NVMeF layer 121 in storage system 120 with queue numbers Qid 1, Qid 2, Qid 3, Qid 4, Qid 5, and Qid 6. NVMeF layer 113 further bifurcates and pumps the I/Os from common queues to all NVMeF queues equally (this is purely to manage the workload across the I/O queues (IOQs)). These NVMeF queues first access DRAM cache 122 for the required read/write operation. For every cache hit/write hit, storage system 120 reads or writes the data from or to DRAM cache 122; for cache miss or write miss, storage system 120 reads or writes data from or to backend physical storage (drives) 123.

A problem of the system shown in FIG. 1 is performance degradation due to cached or un-cached I/O. NVMe can support about 65 K I/O queues that can be used to cater all types of I/O workloads. Let us consider I/Os in a multi-tenant cloud server scenario. There is host running multiple applications 111, including application A, B, C, D, E, and F. All these applications are accessing the data from same or different volume sets and performing cached I/O to the cloud backend (the cache mentioned here is at the server side cache), since all the applications will submit there I/Os to a single queue (common queue layer 112) which is further submitted to a NVMe-oF layer (NVMeF layer 113) for I/O bifurcation to different NVMeF queue(s), NVMeF queue(s) acts as a fabric connection between host 110 and storage system 120.

All the storage system(s) is/are associated with a cache (DRAM cache) sitting above the backend physical storage as a first data location, all the I/Os will pass through cache before accessing the backend drives irrespective of read or write I/Os. The cache memory is non-persistent data location comprising high performance, low capacity space. Considering a situation where all the applications connected to the storage systems are performing I/O operations, the cache will start getting filled up and after a while it will get filled by the current application data based on first in first out (FIFO) format. As the cache is full, the application workloads are being filled in the cache in FIFO mode. There are literally 1000's of applications that are accessing the storage volume; hence, till the time the first application revisits the same data request, the data is already being moved to slower performing locations because of constrained space is shared across multiple applications. This increases cache miss of certain important applications. In the multi-tenant environment, there are some of the tenants that have paid more to get more performance benefits and other may access the storage space with less price-point calculation. In such deployments, because of the cache full consequence by low paying applications, the gold customers need to suffer even if they have paid more. This impacts the application performance since all the NVMeF queue(s) and applications will have equal access to the cache. Amongst all the application (s) running in the host, some application may be of those customer(s) who have paid more for storage space and also expects good performance they will also start to suffer the degraded performance.

For a multi-tenant example, let us divide the applications into three categories: applications A and B (in running multiple applications 111) as gold customer(s) who have paid heavily for storage space and performance, applications C and D as silver customer(s) who have paid moderate amount for storage space and performance, and applications E and F as bronze customer(s) who have paid low for storage space and performance. The storage space mentioned here is the amount of storage space from backend physical storage (drives) 123. Although gold, silver, and bronze customers have paid different amount but all of them suffer the performance degrade. The gold customers who have paid the highest amount also suffers the performance issue due to cache miss as the current cache association is consumed by silver or bronze applications I/O queues.

Since all the I/O queues created between host 110 and storage controller(s) of storage system 120 can perform cached I/O to the storage volumes, there is no means to control which I/O needs to get cache hit (or miss) to provide better application level performance benefits. There is no way today by which the block storage can know identity and type of application from which the I/O is initiated (sending the application identity in the I/O command is very expensive in terms of space and processing requirements). Since a powerful host can run high number of applications, the performance of a large-scale system will get further degraded to a large extent for all the customers who are using the storage target.

As a result of cache miss of importance application workload, backend physical storage (drives) 123 access to read/write data will be more; these highly paid and gold rated applications experience more latency which may result in application slowdown and degraded input/output operations per second (IOPS) and hence overall system performance degrades.

An isolation-oriented solution to the above-mentioned problem is to create a different set of volumes and map them to the applications if the host is running different virtual machines (VM) or containers. However, the solution does not work for systems like VMWare systems where the common datastore is exposed from the storage systems and being shared by all the virtual machines to access the data. In such cases, there is no way by which the backend controller can get the identity of a VM or container application; further, such mechanisms are commonly used in the deployment field to leverage additional advantages of VMWare and other hypervisor management platforms. Existing solutions to this problem are dependent on the type of a storage system and cache associated with the storage system. A first solution is either to limit or to put a cap on maximum numbers of applications a host should run based on the cache memory size present in the storage system; this will enhance the overall performance since applications will be less and cache will be more. A second solution is vice-versa of the first one based on the maximum numbers of applications a host can run; the second solution is to increase the size of cache so that cache size will not affect the system performance.

The above-mentioned solutions have major drawbacks and scalability issues that restricts multi-tenant cloud hosting. The first solution, in which a cap is put or the number of applications a host can run is limited, will not let the user utilize the host capability; less number of applications means less percentage of CPU utilization, i.e., more CPU free time which will affect the system scalability and deals with underutilized CPU cost. The second solution, in which the cache size is increased, will come with huge financial cost associated with increasing the cache size. The solutions should make all the customers happy based on the price they have paid and give justice to each I/O coming from highly paid customers.

Embodiments of the present invention disclose a mechanism working with the NVMe enabled storage subsystems and provides a way to have dedicated cache controlled (enabled or disabled) NVMe I/O queue (IOQ) creation capability from a host subsystem to a target storage device. The mechanism further provides creation of NVMe IOQ based on application(s) associated with different class of customers (for example, gold, silver, and bronze) in a multi-tenant NVMe host system, in order to avoid scenarios resulting in performance degradation, drop in IOPs, and increase in backend physical drive access. The storage controller instance of the present invention provisions the cache capacity partitioning based on associated IOQ types and accordingly manages the caching of upcoming I/O workload to get better application performance. To achieve this, the storage system based on the classes of applications (for example, gold, silver, and bronze) partitions the cache and pumps I/Os coming from selected I/O queues to particular cache partitions.

The present invention has following advantages. (1) Reduced I/Os bottleneck: Since there are dedicated queues associated with each cache partition, the storage system directly pumps the I/Os coming from a particular queue directly to its associated cache so each class of applications gets its fair share of cache and reduced I/O bottleneck. (2) Better performance: Since all the classes of customers gets their cache partitions based upon the price they have paid for the storage space, they will experience better system performance. For example, gold customers have biggest share of cache so that they get better performance than silver or bronze customers. The better performance cannot be realized by using unified cache where all classes of customers access the cache equally. (3) Increase in IOPs: According to a concept of dedicated cache, the IOPs automatically increase since backend access is minimal based upon the classes of customers and their applications. (4) Easy to implement: The present invention does not have any extraordinary hardware and software requirement, hence the present invention can be implemented easily with the current storage system architecture and serves as a real-time problem solution for NVMe based storage systems.

Figure 2:
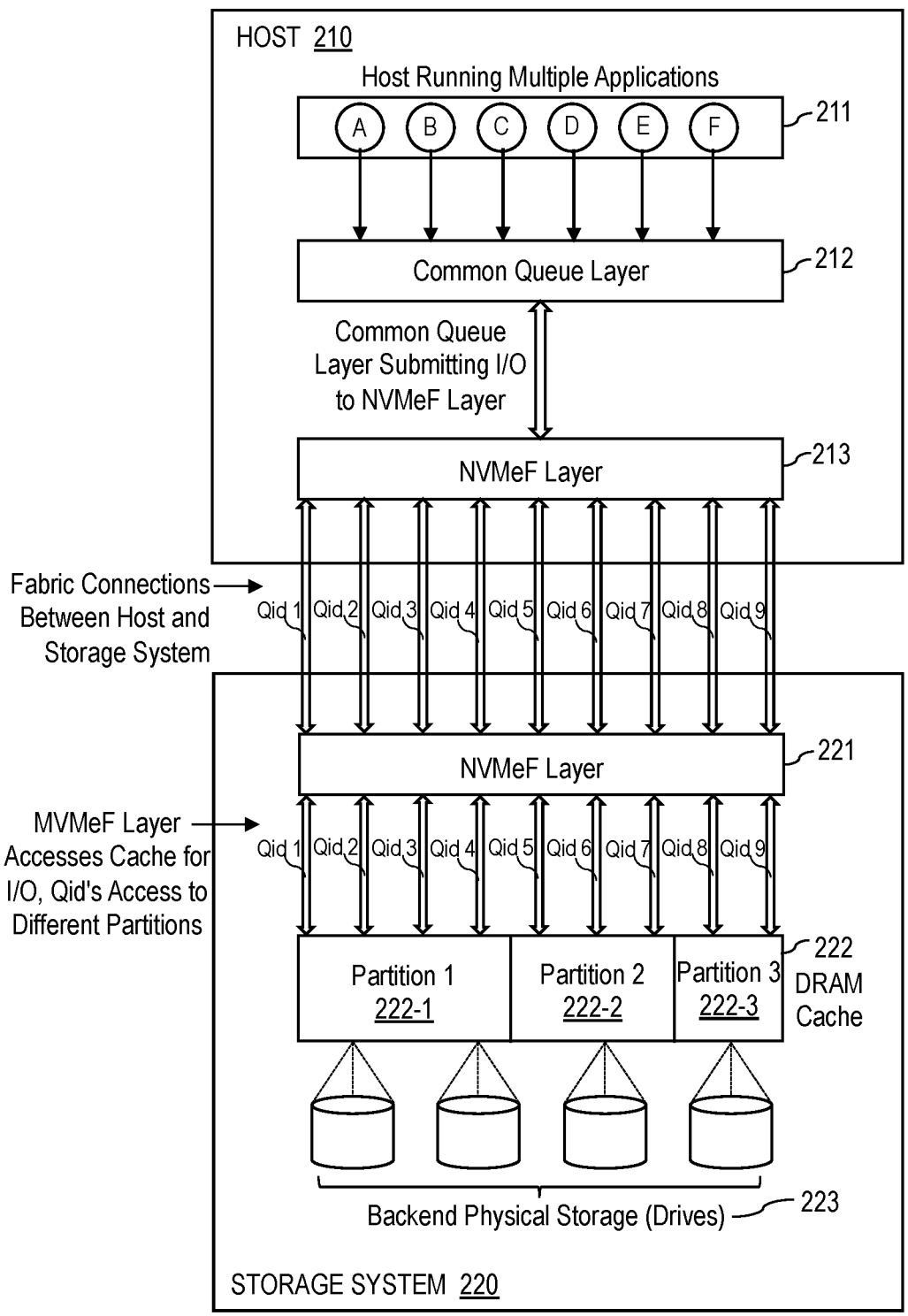
FIG. 2 is a systematic diagram that illustrates improving cached workload management for a multi-tenant host using non-volatile memory express (NVMe) over ethernet remote direct memory access (RDMA) in a storage system, in accordance with one embodiment of the present invention.

Let us take an example to understand it better. FIG. 2 is a systematic diagram that illustrates improving cached workload management for a multi-tenant host using non-volatile memory express (NVMe) over ethernet remote direct memory access (RDMA) in a storage system, in accordance with one embodiment of the present invention.

The multi-tenant cloud environment includes host 210. On host 210, there is host running multiple applications 211, including A, B, C, D, E, and F. Host 210 performs I/O operations to storage system 220, through common queue layer 212 and NVMeF layer 213. After a successful NVMe fabric connection between NVMeF layer 213 on host 210 and NVMeF layer 221 on storage system 220, total 9 queues are created with queue IDs: as shown in FIG. 2, Qid 1, Qid 2, Qid 3, Qid 4, Qid 5, Qid 6, Qid 7, Qid 8, and Qid 9. Assuming the memory size of DRAM cache 222 is 1 terabyte (TB) and partitioning is static, DRAM cache 222 has 3 partitions: partition 1 222-1, partition 2 222-2, and partition 3 222-3. For example, partition 1 222-1 is for gold customers, partition 2 222-2 for silver customers, and partition 3 222-3 for bronze customers. Here, the gold customers, silver customers, and bronze customers are classified based on the amount paid by the customers for their applications doing I/Os for sizes of backend physical storage (drives) 223 and performance expectations. Gold customers pay the highest amount while bronze customers pay the lowest for their storage size and the performance. Storage capacity requirement is fixed, usually the highest storage size for the gold customers and the smallest storage size for the bronze customers. The storage size mentioned here is the block storage capacity which is provisioned by an NVMe target system. For example, in the three cache partitions, partition 1 222-1 is 500 gigabyte (GB) for the gold customers, partition 2 222-2 is 324 GB for the silver customers, and partition 3 222-3 is 200 GB for the bronze customers. Storage system 220 have pre-information about the number and the class (e.g., gold, silver, and bronze) of application running on host 210. For example, let us classify the class of applications A and B in host running multiple applications 211 as gold, C and D as silver, and E and F as bronze. Here, we don't need to know what storage size they have taken for the applications. There is NVMe queue allocation in NVMeF layer 213 for each class of application. In the example, we give I/O queues with Qid 1, Qid 2, Qid 3, and Qid 4 to gold, Qid 5, Qid 6, and Qid 7 to silver, and Qid 8 and Qid 9 to bronze. Therefore, after establishing the I/O queues with host 210, NVMeF layer 213 sets flag which indicates the particular queue or queues to be reserved or dedicated only for a particular type of class. Storage system 220 detects the flags only once at the beginning to get this information along with its caching status.

Host 210 now understands which IOQ is to be used while pushing gold application's I/Os to storage system 220. Now, host 210 pumps I/Os, where the application submits the I/Os first to common queue layer 212 which further submits the application to NVMeF layer 213 for further bifurcation to different NVMeF queues. NVMeF layer 213 has the information which I/O is coming from which application, so NVMeF layer 213 pumps the I/O requests coming from gold class applications (A, B) to Qid 1, Qid 2, Qid 3, and Qid 4 only, the I/O requests coming from silver class applications (C, D) to Qid 5, Qid 6, and Qid 7 only, and the I/O request coming from bronze class applications (E, F) to Qid 8 and Qid 9 only.

On the side of storage system 220, storage system 220 has the information that Qid 1, Qid 2, Qid 3, and Qid 4 are tied with partition 1 222-1 of 500 GB, Qid 5, Qid 6, and Qid 7 are tied with partition 2 222-2 of 324 GB, and Qid 8 and Qid 9 are tied up with partition 3 222-3 of 200 GB. Therefore, all the I/O requests coming from the side of host 210 through I/O queues with Qid 1, Qid 2, Qid 3, and Qid 4 are directed to partition 1 222-1 of 500 GB; similarly, I/O requests coming from Qid 5, Qid 6, and Qid 7 are directed to partition 2 222-2 of 324 GB, and all the I/O requests coming through Qid 8 and Qid 9 are directed to partition 3 222-3 of 200 GB. In this way, the gold customers enjoy the benefit of highest cache size and low latencies, compared to silver customers and bronze customers. The silver customers enjoy moderate cache size and low latencies compared to bronze customers, and bronze customers have the lowest in terms of performance and cache size.

Communication between an NVMe queue manager and a host notifier can be through an out-of-band protocol, using out-of-band application programming interfaces (APIs) that possess capability to communicate between hosts and the storage controller clustered system. In case both these systems are understanding in-band communication using NVMe standards, then the host application attributes information (number of gold, silver, or bronze application running and amount of cache to be reserved for each class) and actuator signals can be passed as part of protocol frames programmatically. The implementation can be done using reserved fields of an IOQ CONNECT response frame to communicate the information.

Figure 3:
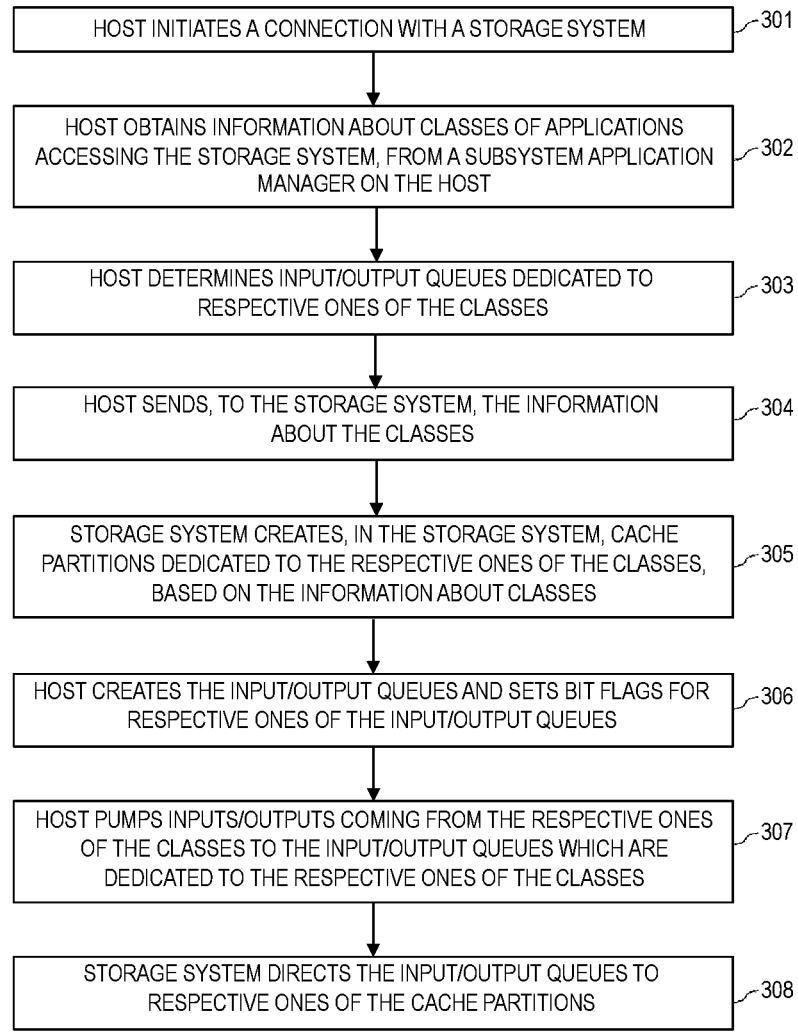
FIG. 3 presents a flowchart showing operational steps of improving cached workload management for a multi-tenant host using non-volatile memory express (NVMe) over ethernet remote direct memory access (RDMA) in a storage system, in accordance with one embodiment of the present invention.

FIG. 3 presents a flowchart showing operational steps of improving cached workload management for a multi-tenant host using non-volatile memory express (NVMe) over ethernet remote direct memory access (RDMA) in a storage system, in accordance with one embodiment of the present invention. The operational steps are implemented by a host and a storage system (such as host 210 and storage system 220 shown in FIG. 2) which are hosted by one or more servers. A server is described in more detail in later paragraphs with reference to FIG. 4. In some embodiments, the operational steps may be implemented in a cloud computing environment. The cloud computing environment is described in more detail in later paragraphs with reference to FIG. 5 and FIG. 6.

At step 301, the host initiates a connection between the host and the storage system, before starting one or more applications. At step 302, the host obtains information about classes of applications accessing the storage system, from a subsystem application manager on the host. The host has information about how many applications in each of the classes. For example, the classes may include a gold class of applications, a silver class of applications, and a bronze class of application. In the example, for the gold class of applications, customers have paid a highest amount for storage space and performance; for the silver class of applications, customers have paid a moderate amount for storage space and performance; for the bronze class of applications, customers have paid a lowest amount for storage space and performance. The host acquires the information about the classes of applications by static configuration-oriented approaches or acquires the information dynamically using run time message exchange. At step 303, the host determines input/output queues for respective ones of the classes. At step 304, the host sends, to the storage system, the information about the classes of applications. The host sends the information to a target storage controller in the storage system.

Now, the storage system has full information about the classes of applications that are going to be run on the host and how many input/output queues for respective ones of the classes to be pumped from the host to the storage system. Thus, the storage system creates, at step 305, in the storage system, cache partitions dedicated to the respective ones of the classes, based on the information about classes. For example, the storage system partitions 45% of a cache for the gold class of applications, 30% for the silver class of applications, and 25% for the bronze class of applications. The percentages of the partitions depend on how many applications in the respective classes. The portioning is done initially just once. The partitioning can be based on admin defined configuration policy settings and accordingly updated while initialization of the cache. The set association of the cache will be instructed accordingly to maintain distinguished access management across each associated set.

At step 306, the host creates the input/output queues and sets bit flags for respective ones of the input/output queues. The bit flags tell the target storage controller in the storage system which input/output queue is associated with which application class; in the example shown in FIG. 2, Qid 1, Qid 2, Qid 3, and Qid 4 are associated with partition 1 222-1 (for gold class), Qid 5, Qid 6, and Qid 7 are associated with partition 2 222-2 (for silver class), and Qid 8 and Qid 9 are associated with partition 3 222-3 (for bronze class). The host further polls for the cache hit/miss status from the IOQ_CONNECT command and decodes the message. A host NVMe-oF driver sends the CACHE_STATE to select the IOQ for cached work. In case the cache field is detected as DISABLED, then the storage system's cache controllers are instructed to bypass I/O from multi-way set association of the storage cache.

At step 307, the host pumps inputs/outputs coming from the respective ones of the classes to the input/output queues which is dedicated to the respective ones of the classes. In the example shown in FIG. 2, the host pumps all the I/Os coming from the gold class applications to dedicated or assigned I/O queues like Qid 1, Qid 2, Qid 3, and Qid 4; similarly, the host pumps all the I/Os coming from the silver class applications to dedicated I/O queues like Qid 5, Qid 6, and Qid 7, and the host pumps all the I/Os coming from the bronze class applications to dedicated I/O queues like Qid 8 and Qid 9. Regarding the IOQ selection policy, IOQ mappers allocated for the application will be shared with the application, and the selection of individual IOQ will be determined by the application to get suitable performance. The IOQ characteristics can be added, removed, and updated using event-based triggering at the storage system, which will be typically needed while changing price-point for application without disruption.

The storage system has information about that I/Os coming from the respective ones of the I/O queues are for the respective ones of the classes; in the example shown in FIG. 2, I/O queues Qid 1, Qid 2, Qid 3, and Qid 4 are for the gold class applications, I/O queues Qid 5, Qid 6, and Qid 7 are for the silver class applications, and I/O queues Qid 8 and Qid 9 are for the bronze class applications. Therefore, at step 308, the storage system directs the input/output queues to respective ones of the cache partitions. In the example shown in FIG. 2, the storage system directs I/O queues Qid 1, Qid 2, Qid 3, and Qid 4 to partition 1 222-1 (reserved for the gold class), I/O queues Qid 5, Qid 6, and Qid 7 to partition 2 222-2 (reserved for the silver class), and I/O queues Qid 8 and Qid 9 to partition 3 222-3 (reserved for the bronze class). If an IOQ is mapped as CACHE_DISABLED, then all I/Os coming from this IOQ are directly sent to lower layers of the storage system, bypassing the cache, which will miss the cache all the time. Applications accessing data with more latency tolerance can use these cache miss IOQs to ensure all the low latency requirement data will remain in the cache.

Figure 4:
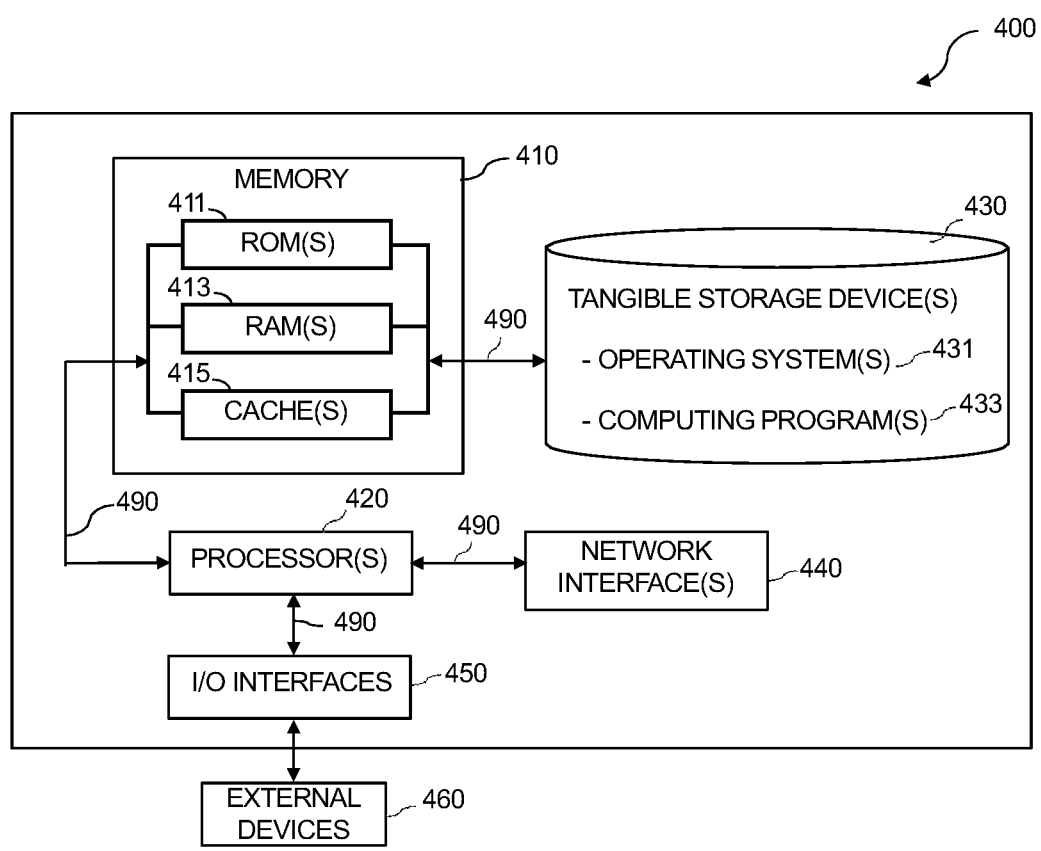
FIG. 4 is a diagram illustrating components of a computing device, in accordance with one embodiment of the present invention.

FIG. 4 is a diagram illustrating components of server 400, in accordance with one embodiment of the present invention. It should be appreciated that FIG. 4 provides only an illustration of one implementation and does not imply any limitations with regard to the environment in which different embodiments may be implemented.

Referring to FIG. 4, server 400 includes processor(s) 420, memory 410, and tangible storage device(s) 430. In FIG. 4, communications among the above-mentioned components of server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Server 400 further includes I/O interface(s) 450. I/O interface(s) 450 allows for input and output of data with external device(s) 460 that may be connected to server 400. Server 400 further includes network interface(s) 440 for communications between server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
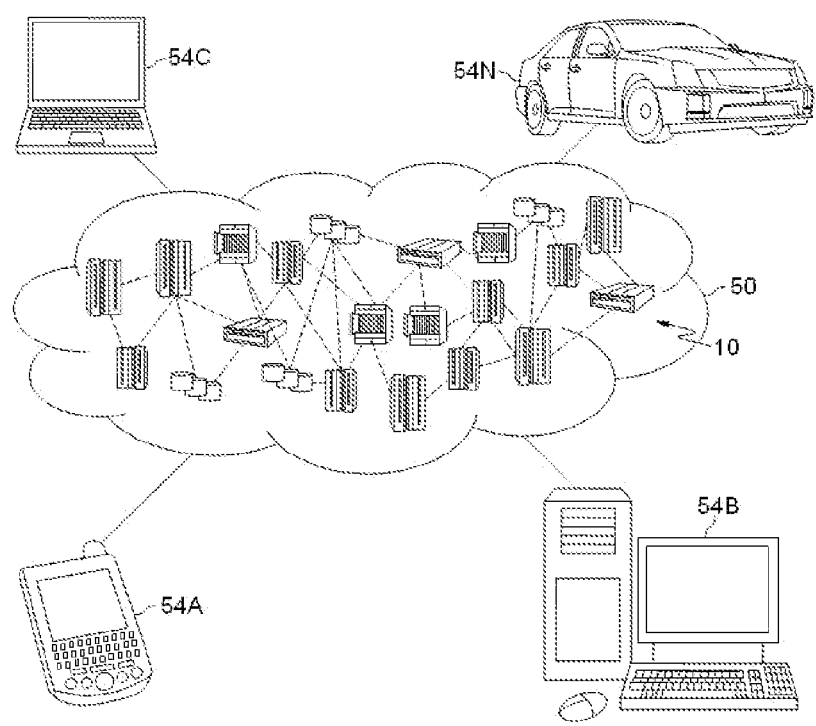
FIG. 5 depicts a cloud computing environment, in accordance with one embodiment of the present invention.
Figure 6:
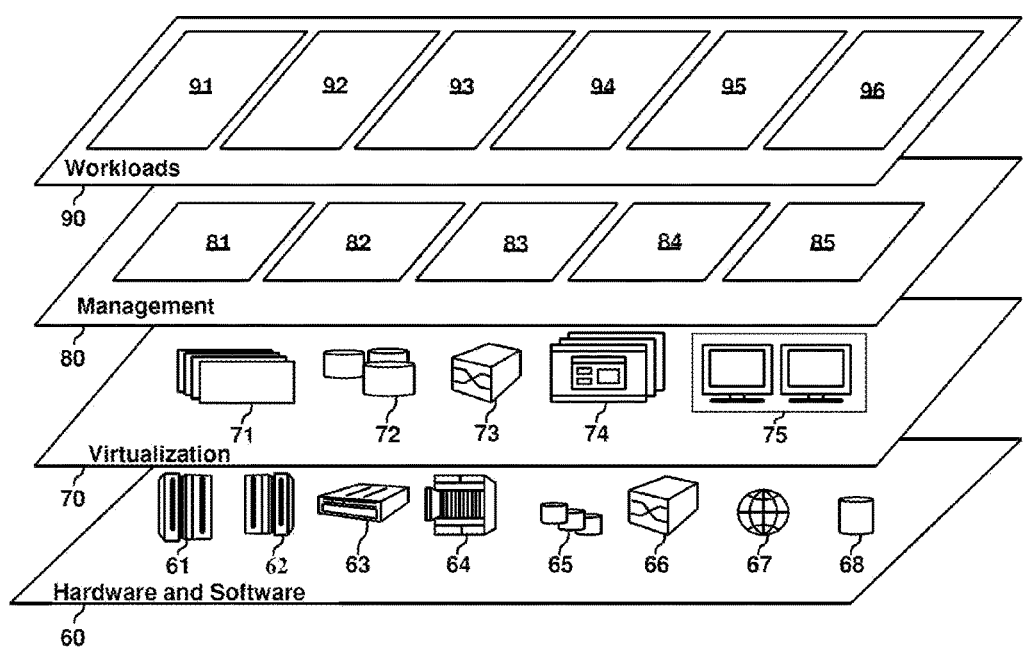
FIG. 6 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of improving cached workload management for a multi-tenant host in a cloud computing environment.

What is claimed is:

1. A computer-implemented method for improving cached workload management, the method comprising:

obtaining, by a host in a system comprising the host and a storage system, information about classes of applications running on the host and accessing the storage system;

determining, by the host, input/output queues dedicated to respective ones of the classes;

sending to the storage system, by the host, the information about the classes, wherein, based on the information, the storage system divides a dynamic random-access memory (DRAM) cache in the storage system into multiple cache partitions, wherein the multiple cache partitions are dedicated to the respective ones of the classes;

creating, by the host, the input/output queues and setting bit flags for respective ones of the input/output queues;

pumping, by the host, inputs/outputs coming from the respective ones of the classes to the respective ones of the input/output queues, wherein the storage system directs the input/output queues to respective ones of the multiple cache partitions of the DRAM cache in the storage system; and polling, by the host, a hit/miss status of a respective one of the input/output queues, wherein, in response to the respective one of the input/output queues is mapped as cache_disabled, the respective one of the input/output queues bypasses the multiple cache partitions of the DRAM cache in the storage system.

2. The computer-implemented method of claim 1, wherein the respective ones of the classes are provided with respective levels of storage space and respective levels of performance in the storage system.

3. The computer-implemented method of claim 1, further comprising:

creating, by the storage system, the multiple cache partitions dedicated to the respective ones of the classes.

4. The computer-implemented method of claim 1, further comprising:

directing, by the storage system, the input/output queues to the respective ones of the multiple cache partitions.

5. The computer-implemented method of claim 1, wherein the information about the classes are obtained by the host from a subsystem application manager on the host.

6. The computer-implemented method of claim 1, wherein the bit flags tell a target storage controller in the storage system which input/output queue is associated with which application class.

7. The computer-implemented method of claim 1, wherein the inputs/outputs coming from the respective ones of the classes are pumped by a non-volatile memory express over fabrics layer on the host.

8. The computer-implemented method of claim 1, wherein the bit flags for the respective ones of the input/output queues are set by a non-volatile memory express over fabrics layer, wherein the bit flags are detected by the storage system.

9. A computer-implemented method for improving cached workload management, the method comprising:

receiving from a host, by a storage system in a system comprising the host and the storage system, information about classes of applications accessing the storage system;

based on the information about the class, dividing, by the storage system, a dynamic random-access memory (DRAM) cache in the storage system into multiple cache partitions, wherein the multiple cache partitions are dedicated to respective ones of the classes;

receiving from the host, by the storage system, input/output queues dedicated to the respective ones of the classes;

directing, by the storage system, the input/output queues to respective ones of the multiple cache partitions of the DRAM cache in the storage system; and in response to a respective one of the input/output queues is mapped as cache_disabled, bypassing, by the storage system, the multiple cache partitions of the DRAM cache in the storage system of the respective one of the input/output queues.

10. The computer-implemented method of claim 9, wherein the respective ones of the classes are provided with respective levels of storage space and respective levels of performance in the storage system.

11. The computer-implemented method of claim 9, further comprising:

initiating, by the host, a connection between the host and the storage system;

obtaining from a subsystem application manager on the host, by the host, the information about the classes;

determining, by the host, the input/output queues dedicated to the respective ones of the classes; and sending to the storage system, by the host, the information about the classes.

12. The computer-implemented method of claim 9, further comprising:

creating, by the host, the input/output queues and setting bit flags for respective ones of the input/output queues; and pumping, by the host, inputs/outputs coming from the respective ones of the classes to the respective ones of the input/output queues.

13. The computer-implemented method of claim 12, wherein the bit flags tell a target storage controller in the storage system which input/output queue is associated with which application class.

14. The computer-implemented method of claim 12, further comprising:

detecting, by the storage system, the bit flags for the respective ones of the input/output queues.

15. A computer system for improving cached workload management, the computer system comprising one or more processors, one or more computer readable tangible storage devices, and program instructions stored on at least one of the one or more computer readable tangible storage devices for execution by at least one of the one or more processors, the program instructions executable to:

obtain, by a host in a system comprising the host and a storage system, information about classes of applications accessing the storage system;

determine, by the host, input/output queues dedicated to respective ones of the classes;

send to the storage system, by the host, the information about the classes;

based on the information about the class, divide, by the storage system, a dynamic random-access memory (DRAM) cache in the storage system into multiple cache partitions, wherein the multiple cache partitions are dedicated to the respective ones of the classes;

create, by the host, the input/output queues and set bit flags for respective ones of the input/output queues;

pump, by the host, inputs/outputs coming from the respective ones of the classes to the respective ones of the input/output queues;

direct, by the storage system, the input/output queues to respective ones of the multiple cache partitions of the DRAM cache in the storage system;

poll, by the host, a hit/miss status of a respective one of the input/output queues;

in response to a respective one of the input/output queues is mapped as cache_disabled, bypass, by the storage system, the multiple cache partitions of the DRAM cache in the storage system of the respective one of the input/output queues.

16. The computer system of claim 15, wherein the respective ones of the classes are provided with respective levels of storage space and respective levels of performance in the storage system.

17. The computer system of claim 15, wherein the information about the classes are obtained by the host from a subsystem application manager on the host.

18. The computer system of claim 15, wherein the bit flags tell a target storage controller in the storage system which input/output queue is associated with which application class.

19. The computer system of claim 15, wherein the inputs/outputs coming from the respective ones of the classes are pumped by a non-volatile memory express over fabrics layer on the host.

20. The computer system of claim 15, wherein the bit flags for respective ones of the input/output queues are set by a non-volatile memory express over fabrics layer on the host, wherein the bit flags are detected by the storage system.

* * * * *